US008234031B2

(12) United States Patent  (10) Patent No.: US 8,234,031 B2
Jerwick  (45) Date of Patent: Jul. 31, 2012

(54) HYBRID VEHICLE ENERGY MANAGEMENT METHODS AND APPARATUS

(75) Inventor: John Jerwick, Hagerstown, PA (US)

(73) Assignee: Mack Trucks, Inc., Greensboro, NC (US)

(\*) Notice: Subject to any disclaimer, the term of this patent is extended or adjusted under 35 U.S.C. 154(b) by 479 days.

(21) Appl. No.: 12/527,764

(22) PCT Filed: Feb. 22, 2007

(86) PCT No.: PCT/US2007/062575
§ 371 (c)(1),
(2), (4) Date: Aug. 19, 2009

(87) PCT Pub. No.: WO2008/103173
PCT Pub. Date: Aug. 28, 2008

(65) Prior Publication Data
US 2010/0094494 A1    Apr. 15, 2010

(51) Int. Cl.
*B60L 9/00* (2006.01)
(52) U.S. Cl. ........ 701/22; 701/37; 180/65.21; 180/65.1; 180/65.285
(58) Field of Classification Search .......... 701/22, 701/36, 37; 180/65.21, 65.7, 65.1, 65.285; 74/661
See application file for complete search history.

(56) References Cited

U.S. PATENT DOCUMENTS

| 5,713,425 A | 2/1998 | Buschhaus |
| 2003/0015358 A1 | 1/2003 | Abe et al. |
| 2004/0009842 A1 | 1/2004 | Inada |
| 2006/0116797 A1 | 6/2006 | Moran |
| 2007/0216221 A1* | 9/2007 | Zillmer et al. ............. 303/151 |
| 2009/0018716 A1* | 1/2009 | Ambrosio .................. 701/22 |
| 2009/0139784 A1* | 6/2009 | Bordini ................... 180/65.23 |

FOREIGN PATENT DOCUMENTS

| EP | 0878339 A2 | 11/1998 |
| EP | 1063120 A2 | 12/2000 |
| JP | 2005-269752 | 9/2005 |
| WO | 2006134475 A2 | 12/2006 |

OTHER PUBLICATIONS

Drewitz H-J: "The Distribution Truck with Two Drive Systems", Man Forschen Planen Bauen, Man Maschinenfabrik Augsburg-Nuernbert A.G. Augsburg, DE Jan. 1, 1994, pp. 4-11 XP000517119.
Extended European search report for corresponding EP application No. 07757327.7.

\* cited by examiner

*Primary Examiner* — Gertrude Arthur Jeanglaude
(74) *Attorney, Agent, or Firm* — Martin Farrell; Michael Pruden

(57) ABSTRACT

A parallel hybrid vehicle launches from rest or near rest with its electric motor and blends in its internal combustion engine at a vehicle speed such that the electrical energy provided to the motor from an energy storage device is only as much energy as can be recovered during deceleration of the vehicle to rest or near rest.

7 Claims, 3 Drawing Sheets

HYBRID VEHICLE ENERGY MANAGEMENT METHODS AND APPARATUS

BACKGROUND

This invention relates to a vehicle, such as a refuse truck, having an internal combustion engine and an electric motor in parallel, meaning that either or both of the engine and motor can drive the vehicle's transmission.

Hybrid vehicles typically use two types of stored energy: chemical and electrical. An internal combustion engine (ICE) in a hybrid vehicle converts chemical energy into mechanical energy in the combustion chambers. An electric motor in the hybrid vehicle converts stored electrical energy into mechanical energy.

In some hybrid vehicles, the electric motors supplement the ICEs, which is to say that the electric motors supply driving torque to assist the ICEs. Such hybrid vehicles are sometimes called "parallel hybrids". Other hybrid vehicles are driven by the electric motors, with the ICEs driving generators that charge batteries or other electric energy storage devices. Such hybrid vehicles are sometimes called "series hybrids".

A parallel hybrid vehicle thus usually includes an ICE, an electric motor, and a transmission, drive shaft, axle carrier, axle, and wheels, all of which are arranged in series to transmit torque from the ICE and motor to the wheels. Such a hybrid vehicle can be operated by either the engine only, or the motor only, or the engine and motor together. The electric motor may be operated as an electric generator during deceleration of such a vehicle to recover some of the vehicle's kinetic energy.

Typical hybrid vehicles, such as that described in U.S. Pat. No. 5,984,033 to Tamagawa et al., size the ICE to meet average power demands and size the electric motor to meet peak power demands. Of course, such designs are not optimal for every vehicle application, in particular delivery and pick-up applications which involve frequent starts and stops. In such applications, careful management of the energy expended during acceleration and the energy regenerated during deceleration is necessary for optimal vehicle efficiency.

U.S. Pat. No. 5,942,879 to Ibaraki discloses a hybrid vehicle that uses an electric motor as a generator and vehicle braking device. Recovered energy is managed for controlling a battery's state of charge. During deceleration regeneration, an optimal rotation speed at which the regeneration output of the motor/generator becomes maximal is determined, and the vehicle's transmission gear ratio is controlled such that the rotation speed of the motor/generator is the calculated optimum speed.

U.S. Pat. No. 5,875,864 to Yano et al. discloses calculating an amount of regenerated energy that can be captured during engine deceleration for use in controlling recharge of a battery array. The patent discusses opening an engine intake air valve to reduce engine retarding torque, allowing the motor/generator to capture more energy from slowing the vehicle.

U.S. Pat. No. 6,523,626 to Wakashiro et al. discloses a control device for a hybrid vehicle that monitors the depth of discharge of a storage unit, in particular a capacitor, and recharges the capacitor using regenerative braking or engine output when the depth-of-discharge exceeds a threshold.

U.S. Pat. No. 6,945,905 to Tamai et al. discloses methods of monitoring the state of charge of a battery in a hybrid vehicle and selecting a gear ratio so that a motor/generator produces a desired level of regenerated braking energy.

U.S. Patent Application Publication No. 2004/0204797 by Vickers describes an apparatus for regulating the engine in a hybrid vehicle. A circuit computes a distance from the vehicle to a predetermined destination and senses an amount of energy in an electric storage cell. The circuit regulates the engine as a function of the distance and the amount of energy, giving the vehicle operator the option of arriving with low charge and using an electric outlet for charging, or using engine or braking regeneration on the way for recharging.

These and other prior approaches to energy management in hybrid vehicles still suffer from drawbacks in various vehicle applications, such as delivery and pick-up applications.

SUMMARY

In accordance with aspects of this invention, there is provided a method of operating a parallel hybrid vehicle having an electric motor/generator, an ICE, and an electric energy storage device. The method includes the steps of accelerating the vehicle from rest or near rest with only the electric motor/generator; determining a blend-in speed; if the vehicle's speed is greater than the blend-in speed, further accelerating the vehicle to a predetermined maximum speed with both the electric motor/generator and the ICE; decelerating the vehicle to rest or near rest; regenerating electric energy from decelerating the vehicle; and storing regenerated electric energy in the electric energy storage device. An amount of electric energy stored is substantially the same as an amount of electric energy withdrawn from the electric energy storage device while accelerating the vehicle.

In accordance with further aspects of this invention, there is provided a parallel hybrid vehicle that includes an electric motor/generator; an ICE; an electric energy storage device; and at least one controller. The controller is configured to control the electric motor/generator and the ICE such that the vehicle accelerates from rest or near rest to a blend-in speed with only the electric motor/generator, accelerates from the blend-in speed to a maximum speed with the ICE and the electric motor/generator, and decelerates from the maximum speed to rest or near rest. As the vehicle decelerates, an amount of electric energy is regenerated and stored in the electric energy storage device that is substantially the same as an amount of energy withdrawn from the electric energy storage device while accelerating the vehicle.

BRIEF DESCRIPTION OF THE DRAWINGS

The objects, features, and advantages of this invention will be understood by reading this description in conjunction with the drawings, in which.

DETAILED DESCRIPTION

Figure 1:
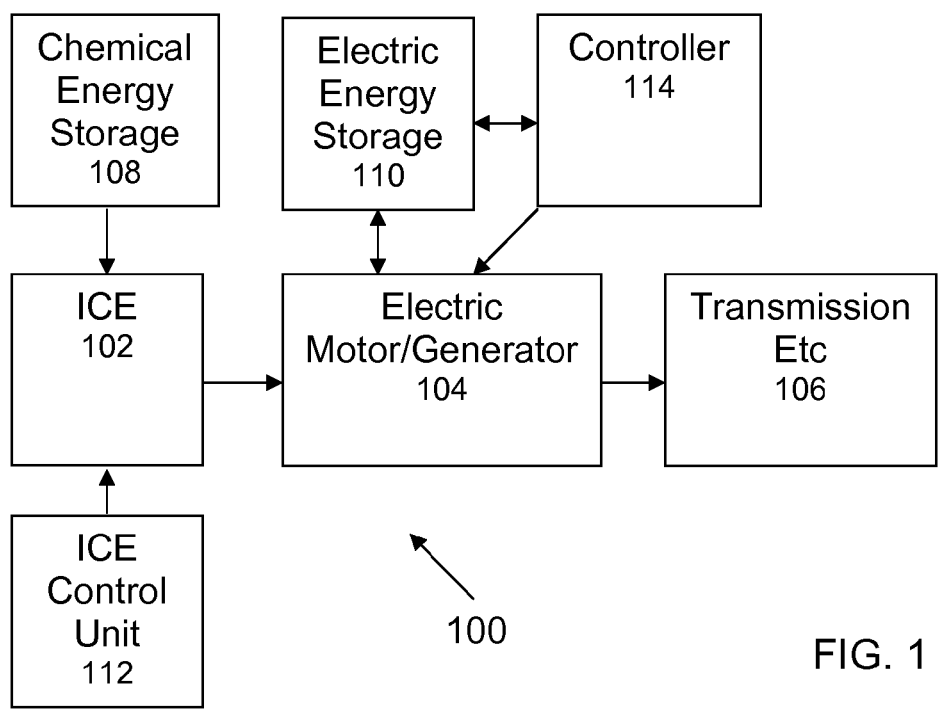
FIG. 1 is a block diagram of a parallel hybrid vehicle.

FIG. 1 is a block diagram of a typical parallel hybrid vehicle 100, which includes an ICE 102, an electric motor/generator 104, and a transmission, drive shaft, axle carrier, axle, and wheels 106. As described above, the components 102, 104, 106 are arranged in series to transmit torque from the ICE and motor to the transmission and wheels. Also shown in FIG. 1 are a chemical energy storage device 108 for the ICE 102, e.g., a fuel tank, and an electric energy storage device 110 for the motor/generator 104, e.g., a rechargeable battery, capacitor, magnetic or inductive media, fuel cell, flywheel, or compressed air or other fluid storage device.

The operations of the ICE 102 and motor/generator 104 are controlled by respective suitable programmable electronic control units 112, 114 that may cooperate with each other in operating the ICE 102 and motor/generator 104. The control unit 114 is also shown as controlling the operation of the electric energy storage 110 such that the storage 110 can deliver energy to the motor/generator 104 and receive energy from the motor/generator 104, as appropriate. For reasons that are described in more detail below, the controller 114 measures or receives a measure of the state of charge of the electric energy storage device 110. The energy produced by the motor/generator 104 is derived from the kinetic energy of the transmission etc. 106. The controllers 112, 114 are shown as separate devices but it will be understood that this is not necessary as many arrangements of the functionality implemented by the controllers are possible.

The arrangement depicted in FIG. 1 can be used for many applications, including delivery/pick-up applications, e.g., mail delivery and trash pick-up. The duty cycle of a vehicle in a delivery/pick-up application typically comprises launching the vehicle from rest or near rest, accelerating to a given speed, e.g., 12 miles per hour (mph), and then immediately or nearly immediately decelerating to rest or near rest. For example, a typical trash pick-up truck uses a diesel engine for converting chemical energy into mechanical energy for propulsion. In a conventional trash truck, mechanical energy is dissipated in mechanical friction brakes in the form of heat, but in a hybrid trash truck, the mechanical energy is not completely dissipated but generates, or re-generates, electric energy that is stored.

The inventor has recognized that a hybrid vehicle used in a delivery/pick-up application can benefit from an energy management strategy that achieves the most efficient energy usage possible for the vehicle duty cycle. Thus, in contrast to systems such as those described in U.S. Pat. No. 5,942,879 cited above, it is advantageous for the vehicle to use only enough energy in the motor during acceleration as can be predicted will be recovered from the generator during deceleration. Such an energy management strategy is readily implemented by suitable programming in one or more of the controllers 112, 114.

Figure 2:
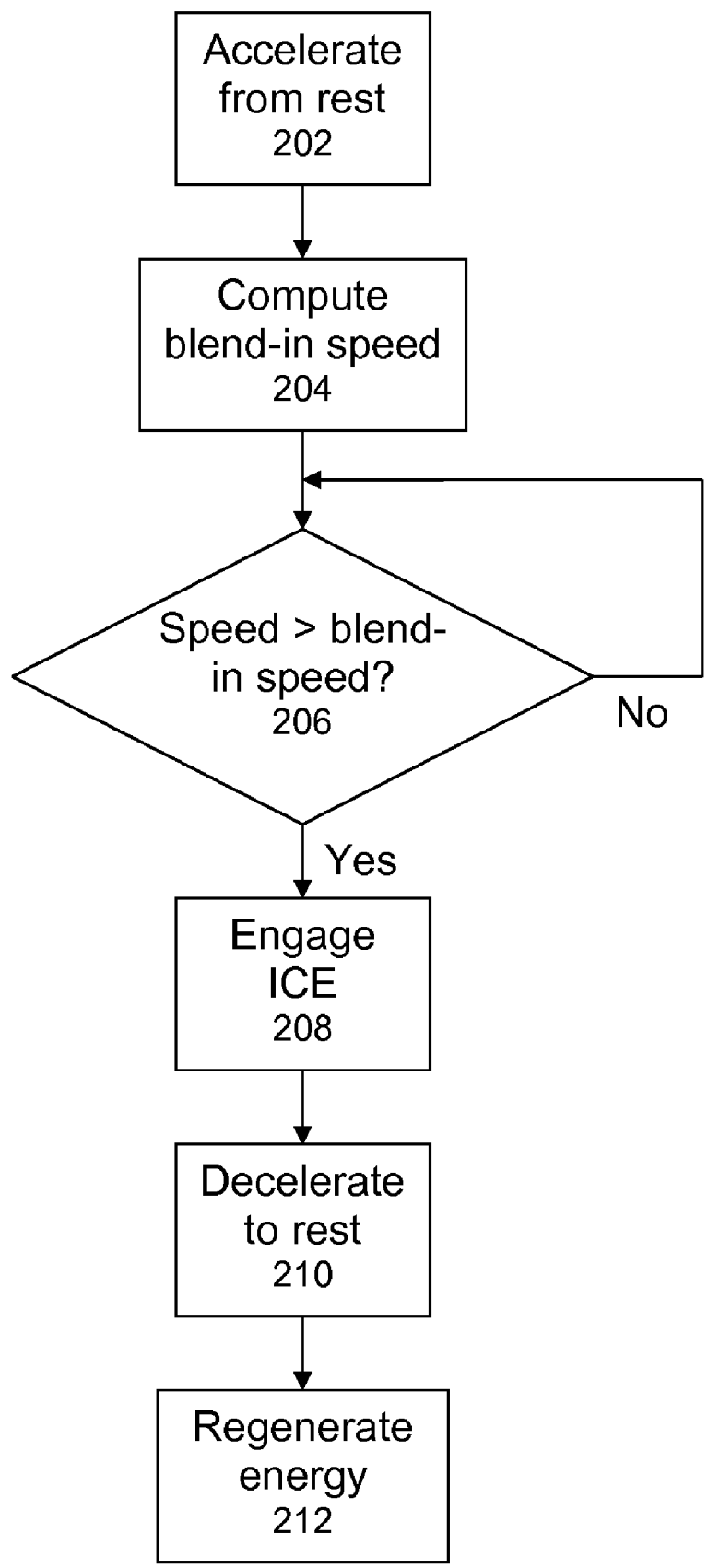
FIG. 2 is a flow chart of a method of energy management.

In response to the programming, the controller(s) carry out the steps of a method such as that depicted by the flow chart in FIG. 2 in which the vehicle 100 is launched electrically, which is to say without assistance from its ICE 102, and then the ICE is "blended in", which is to say that the vehicle is propelled by both its electric motor 104 and its ICE 102, at a speed that is determined as just about high enough such that electrical energy expended during acceleration can be regenerated during deceleration.

Accordingly, the method begins by accelerating the vehicle from rest or near rest with its electric motor (step 202). A blend-in speed is computed as described in more detail below (step 204), and if the vehicle's speed accelerates past the blend-in speed (Yes in step 206), the vehicle's ICE is operated such that the vehicle is propelled by both its electric motor and its ICE (step 208). If the vehicle's speed does not accelerate past the blend-in speed (No in step 206), the vehicle may continue to be propelled by its electric motor. The vehicle is then decelerated to rest or near rest (step 210), and some of the kinetic energy of the vehicle is recovered by operating the electric motor as a generator and is stored in the vehicle's electric energy storage device (step 212). This method can be repeated in each start/stop cycle of the vehicle.

Energy used by the motor and ICE in propulsion can be regenerated in a conventional way by changing the state of the motor/generator from a motor state to a generator state. Such a state change is readily accomplished in a known way by operations of the controller 114. As described above, the motor/generator's generating electrical energy provides a retarding torque to the wheels that slows the vehicle, and any additional retarding torque needed by the driver to slow the vehicle is furnished by the vehicle's service brakes. One of the advantages of a hybrid vehicle is that the regenerating process reduces the amount of energy dissipated by the service brakes, which in turn reduces their maintenance interval.

Figure 3:
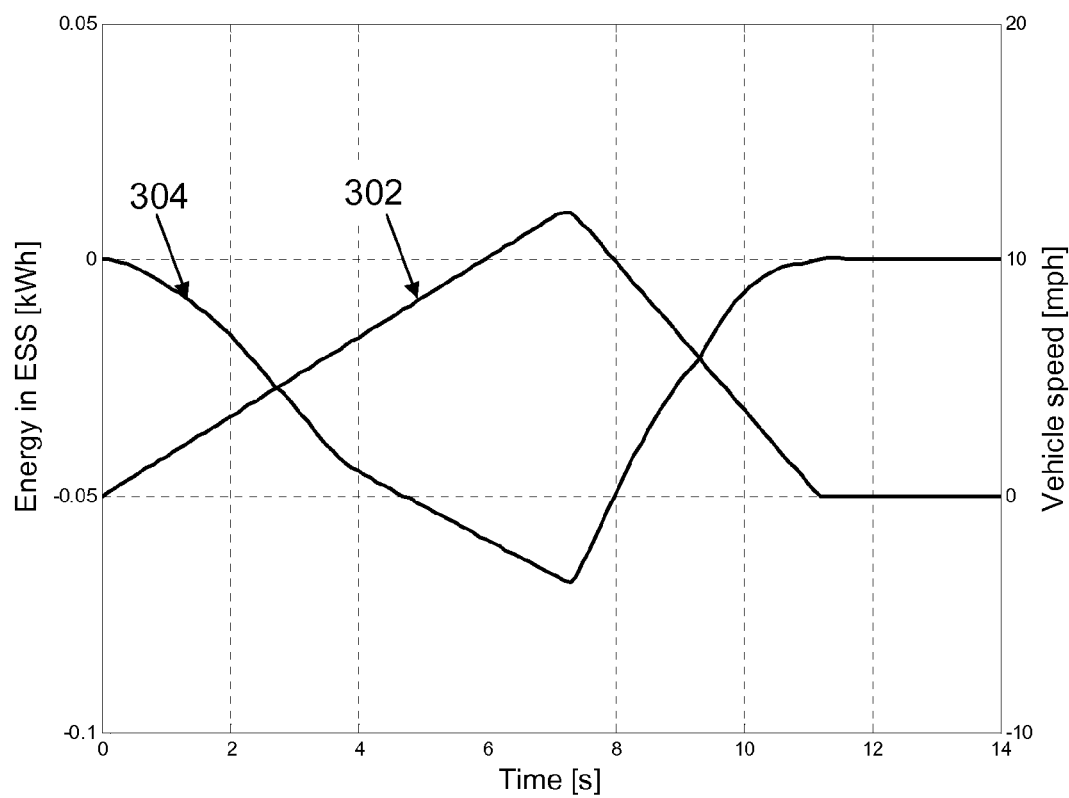
FIG. 3 is a graph of speed and state of charge with respect to time for a pick-up/delivery duty cycle.

FIG. 3 is a graph that shows the state of charge of an electric energy storage system (ESS) 110 (left-side vertical axis) and a vehicle's speed (right-side vertical axis) versus time (horizontal axis). The state of charge is plotted in units of kilowatt-hours (kWh), the speed is plotted in units of mph, and the time is plotted in units of seconds (s).

FIG. 3 shows a speed-vs.-time curve 302 that is typical of delivery/pick-up applications. The speed increases linearly from zero or near zero mph at time zero to a maximum of about 12 mph at 7.3 seconds, and then decreases linearly to zero or near zero mph at 11 seconds, remaining at zero mph until at least 14 seconds. It will be understood that the maximum of 12 mph is merely an example and that the actual maximum speed depends on many factors, such as the distance to the next delivery/pick-up point, gear ratio, etc. Moreover, it is assumed that the vehicle starts from rest in its lowest gear, but this is not necessary. At speeds greater than the maximum speed, e.g., for travel to a transfer/drop-off station, the vehicle can be powered by the ICE alone.

FIG. 3 also shows a state-of-charge-vs.-time curve 304 that is the result of an improved energy management method in accordance with this invention. The stored energy decreases from an arbitrary value of zero kWh at time zero to about −0.04 kWh at 3.5 s due to acceleration of the vehicle by the electric motor. The bend in the curve 304 at time 3.5 s corresponds to a gear shift in the vehicle's transmission, and is an advantageous point for blending in the ICE to continue accelerating the vehicle to the maximum speed. FIG. 3 shows that adding the ICE reduces the rate of energy withdrawal from the ESS, reaching a maximum withdrawal of about 0.07 kWh when the vehicle's maximum speed is achieved at 7.3 s. As the vehicle decelerates from the maximum speed to zero, electric energy is regenerated and stored in the ESS, returning the ESS to the arbitrary zero state-of-charge at 11 s. As described above, the ICE is blended in at a speed that is determined as just about high enough such that electrical energy expended during acceleration can be regenerated during deceleration.

The energy that can be regenerated during deceleration and stored can be readily calculated by a suitably programmed controller using, for example, the state of charge of the electric energy storage device as a measure of the use of energy in the vehicle. The energy storage device can be one or more ultracapacitors, which are high-energy-density capacitors, and the controller can measure the voltage of the ultracapacitors and determine the state of charge based on that voltage, which is proportional to the state of charge. Ultracapacitors are commercially available from a number of manufacturers, including for example Maxwell Technologies, Inc., San Diego, Calif., USA, and Evan Capacitor Co., East Providence, R.I., USA.

Blend-in speeds can also be determined from computations based on the kinetic energy of the vehicle. The hybrid vehicle can include one or more accelerometers and devices for monitoring wheel speed, and many transmissions, such as those commercially available from Eaton Corp., Cleveland, Ohio, USA, and ZF Industries, Inc., Gainesville, Ga., USA, include devices for monitoring engine torque. From the torque and accelerometer measurements, a controller can determine the mass of the vehicle, which may have a total weight of 66,000 pounds.

A typical energy storage device can accept energy at a maximum predetermined rate to achieve a nominal state of charge value. For example, a battery can be charged only at a rate that is less than or equal to a maximum rate, e.g., 10 watt-hours/hour. In some hybrid-vehicle designs, this would constrain the amount of energy that can be returned to the ESS during deceleration, and thereby could affect the determined blend-in speed. Although such a design that focusses on the energy storage system may be useful, the inventor has recognized that it is more advantageous to focus on the electric motor/generator. Implementations of this invention are useful in a hybrid vehicle that has an ICE that can provide sufficient power under all operating conditions and an electric motor/generator that is used for energy recovery and launch assist. Many hybrid vehicles are not designed in that way.

The typical hybrid vehicle has an engine that provides average power needs and a motor that provides additional transient power needs. Typical energy storage strategies thus try to keep the state of charge of the system targeted to a nominal value. By targeting a nominal state of charge, the energy storage system has energy available for transient power needs and enough capacity available for accepting energy from long braking periods. The engine can be used to convert chemical energy into mechanical energy for conversion by the generator into electrical energy for increasing the state of charge to its target. Because the energy conversion process is inherently inefficient, every time energy is converted energy is lost. Vehicles implementing this invention minimize such losses.

If the energy required by the vehicle's electrically powered auxiliary equipment, such as an air compressor, power steering system, etc., is more than the energy that can be recovered during vehicle deceleration in a typical delivery/pick-up cycle, the vehicle can be launched with the ICE and with the motor/generator in generator mode. When the vehicle reaches terminal velocity, the engine can be turned off based on brake pedal application, and the motor/generator can remain in generator mode until the vehicle comes to rest. At rest, the vehicle's operators may add to the vehicle's load for a period of time, and during this vehicle rest period, the auxiliary equipment is driven electrically, which draws down the state of charge of the energy storage system. This is described in co-pending International Patent Application No. PCT/US2007/062579 by Jerwick filed on the same date as this application for "Hybrid Vehicle Auxiliary Equipment Energy Management", which is incorporated here by reference.

It is expected that this invention can be implemented in a wide variety of environments, including for example trash pick-up trucks. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many vehicles can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The embodiments described above are illustrative and not to be considered restrictive. The scope of the invention is determined by the claims, and all variations and equivalents that fall within the range of the claims are intended to be embraced therein.

What is claimed is:

1. A method of operating a parallel hybrid vehicle having an electric motor/generator, an internal combustion engine (ICE), and an electric energy storage device, comprising the steps of:
   accelerating the vehicle from rest or near rest with only the electric motor/generator;
   determining a blend-in speed such that an amount of electric energy that will be used for accelerating the vehicle to a predetermined maximum speed is substantially the same as an amount of electric energy that will be regenerated during deceleration of the vehicle to rest or near rest;
   if the vehicle's speed is greater than the blend-in speed, further accelerating the vehicle to a predetermined maximum speed with both the electric motor/generator and the ICE;
   decelerating the vehicle to rest or near rest;
   regenerating electric energy from decelerating the vehicle; and
   storing regenerated electric energy in the electric energy storage device;
   wherein an amount of electric energy stored is substantially the same as an amount of electric energy withdrawn from the electric energy storage device while accelerating the vehicle.

2. The method of claim 1, wherein the regenerating step includes changing a state of the electric motor/generator from a motor state to a generator state.

3. The method of claim 1, wherein the amount of energy withdrawn is determined by determining a state of charge of the electric energy storage device.

4. The method of claim 1, further comprising the step of moving the vehicle at a speed greater than the predetermined maximum speed with only the ICE.

5. A parallel hybrid vehicle, comprising:
an electric motor/generator;
an internal combustion engine (ICE);
an electric energy storage device; and
at least one controller that is configured to control the electric motor/generator and the ICE such that the vehicle accelerates from rest or near rest to a blend-in speed with only the electric motor/generator, accelerates from the blend-in speed to a maximum speed with the ICE and the electric motor/generator, and decelerates from the maximum speed to rest or near rest;
wherein the blend-in speed is determined such that an amount of electric energy that will be used for accelerating the vehicle to a maximum speed is substantially the same as an amount of electric energy that will be regenerated during deceleration of the vehicle to rest or near rest, and as the vehicle decelerates, an amount of electric energy is regenerated and stored in the electric energy storage device that is substantially the same as an amount of energy withdrawn from the electric energy storage device while accelerating the vehicle.

6. The vehicle of claim 5, wherein the at least one controller determines the blend-in speed based on the amount of electric energy withdrawn and the maximum speed.

7. The vehicle of claim 5, wherein the amount of electric energy withdrawn is determined from a state of charge of the electric energy storage device.

* * * * *